(12) United States Patent
Talamoni et al.

(10) Patent No.: US 11,274,235 B2
(45) Date of Patent: Mar. 15, 2022

(54) ACRYLIC ADHESIVE COMPOSITIONS AND ACRYLIC ADHESIVE TAPES WHICH ENABLE CLEAN REMOVAL FROM DELICATE SURFACES

(71) Applicant: 3M INNOVATIVE PROPERTIES COMPANY, St. Paul, MN (US)

(72) Inventors: Joao R. Talamoni, Sao Paulo (BR); Susana Shimizu, Sao Paulo (BR); Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 464 days.

(21) Appl. No.: 15/552,344

(22) PCT Filed: Apr. 21, 2016

(86) PCT No.: PCT/US2016/028539
§ 371 (c)(1),
(2) Date: Aug. 21, 2017

(87) PCT Pub. No.: WO2016/172277
PCT Pub. Date: Oct. 27, 2016

(65) Prior Publication Data
US 2018/0037783 A1  Feb. 8, 2018

Related U.S. Application Data

(60) Provisional application No. 62/152,227, filed on Apr. 24, 2015.

(51) Int. Cl.
*C09J 133/08* (2006.01)
*C09J 7/38* (2018.01)
*C08F 220/18* (2006.01)

(52) U.S. Cl.
CPC ....... *C09J 133/08* (2013.01); *C08F 220/1808* (2020.02); *C09J 7/385* (2018.01); *C09J 2433/00* (2013.01)

(58) Field of Classification Search
None
See application file for complete search history.

(56) References Cited

U.S. PATENT DOCUMENTS 2,939,600 A   6/1960   Briggs
3,239,994 A   3/1966   Etzel
(Continued)

FOREIGN PATENT DOCUMENTS

CA   1125670   6/1982
DE   4120480   12/1992
(Continued)

OTHER PUBLICATIONS

Fedors, "A Method for Estimating Both the Solubility Parameters and Molar Volumes of Liquids", Polymer Engineering and Science, Feb. 1974, vol. 14, No. 2. (Year: 1974).*
(Continued)

*Primary Examiner* — Alicia Chevalier
*Assistant Examiner* — Elaine M Vazquez

(57) ABSTRACT

An acrylic adhesive derived from the reaction product of (i) an acrylic acid ester of monohydric alcohol having an alkyl group of 5 to 10 carbon atoms; and (ii) a nonpolar acrylic monomer having a solubility of less than 9.2 as measured with the Fedors method using a homopolymer of the nonpolar acrylic monomer. The acrylic adhesive possesses performance characteristics that enable the adhesive to function in certain embodiments as a pressure-sensitive adhesive for applications involving articles that are sensitive to delamination or tearing upon removal of the adhesive from the article.

20 Claims, 1 Drawing Sheet

(56) References Cited

U.S. PATENT DOCUMENTS

| | | |
|---|---|---|
| 3,987,901 A | 10/1976 | Dullinger |
| 4,540,614 A | 9/1985 | Omori |
| 4,589,946 A | 5/1986 | Borrow |
| 4,700,528 A | 10/1987 | Bernard |
| 4,985,302 A | 1/1991 | Sala |
| 5,069,016 A | 12/1991 | Grossi |
| 5,496,599 A | 3/1996 | Schwartz |
| 5,552,451 A | 9/1996 | Everaerts |
| 5,602,221 A | 2/1997 | Bennett |
| 5,616,670 A | 4/1997 | Bennett |
| 5,626,932 A | 5/1997 | Luhmann |
| 5,640,830 A | 6/1997 | Jabalee |
| 5,657,870 A | 8/1997 | Schottle |
| 5,683,798 A * | 11/1997 | Bennett .............. C08F 220/18 428/312.6 |
| 5,708,109 A | 1/1998 | Bennett |
| 5,708,110 A | 1/1998 | Bennett |
| 5,756,584 A | 5/1998 | Bennett |
| 5,883,149 A | 3/1999 | Bennett |
| 6,021,890 A | 2/2000 | Focke |
| 6,041,572 A | 3/2000 | Gandini |
| 6,105,853 A | 8/2000 | Lamare |
| 6,234,230 B1 | 5/2001 | Petitjean |
| 6,986,234 B2 | 1/2006 | Liedtke |
| 7,080,493 B2 | 7/2006 | Baldanza |
| 7,191,576 B2 | 3/2007 | Talou |
| 7,237,671 B2 | 7/2007 | Chambers |
| 8,137,807 B2 | 3/2012 | Clapper |
| 9,102,774 B2 | 8/2015 | Clapper |
| 2011/0056174 A1 | 3/2011 | Perl |
| 2011/0076492 A1 * | 3/2011 | Fujita .................. C09J 7/21 428/355 AC |
| 2011/0147239 A1 | 6/2011 | Arkins |
| 2011/0237725 A1 | 9/2011 | Clapper |
| 2013/0260149 A1 | 10/2013 | Clapper |
| 2014/0234562 A1 | 8/2014 | Traser |
| 2014/0377553 A1 | 12/2014 | Clapper |

FOREIGN PATENT DOCUMENTS

| | | |
|---|---|---|
| DE | 9318548 | 2/1994 |
| DE | 19605503 | 8/1997 |
| DE | 202004011166 | 9/2004 |
| EP | 0442111 | 8/1991 |
| EP | 0560699 | 9/1993 |
| EP | 0768247 | 4/1997 |
| EP | 0921074 | 6/1999 |
| EP | 1050566 | 11/2000 |
| EP | 1074593 | 2/2001 |
| EP | 2112088 | 10/2009 |
| EP | 2143651 | 1/2010 |
| EP | 2364917 | 9/2011 |
| EP | 2553032 | 2/2013 |
| EP | 2573150 | 3/2013 |
| EP | 2589545 | 5/2013 |
| EP | 2655451 | 10/2013 |
| EP | 2760960 | 8/2014 |
| FR | 2754521 | 4/1998 |
| FR | 2818242 | 6/2003 |
| GB | 1459637 | 12/1976 |
| JP | 58149269 | 9/1983 |
| NL | 9301786 | 5/1995 |
| WO | WO 1991-06424 | 5/1991 |
| WO | WO 1992-11333 | 7/1992 |
| WO | WO 1994-01342 | 1/1994 |
| WO | WO 1994-16950 | 8/1994 |
| WO | WO 1995-06603 | 3/1995 |
| WO | WO 1996-24535 | 8/1996 |
| WO | WO 1997-47549 | 12/1997 |
| WO | WO 1998-07635 | 2/1998 |
| WO | WO 1999-64531 | 12/1999 |
| WO | WO 2003-106581 | 12/2003 |
| WO | WO 2007-012621 | 2/2007 |
| WO | WO 2007-126620 | 11/2007 |
| WO | WO 2007-130458 | 11/2007 |
| WO | WO 2008-005110 | 1/2008 |
| WO | WO 2008-047305 | 4/2008 |
| WO | WO 2009-004651 | 1/2009 |
| WO | WO 2009-024618 | 2/2009 |
| WO | WO 2009-129087 | 10/2009 |
| WO | WO 2009-154856 | 12/2009 |
| WO | WO 2010-009855 | 1/2010 |
| WO | WO 2011-045440 | 4/2011 |
| WO | WO 2011-119363 | 9/2011 |
| WO | WO 2012-052312 | 4/2012 |
| WO | WO 2012-088126 | 6/2012 |
| WO | WO 2013-004340 | 1/2013 |
| WO | WO 2013-048934 | 4/2013 |
| WO | WO 2013-048985 | 4/2013 |

OTHER PUBLICATIONS

Satas, Handbook of Pressure Sensitive Adhesive Technology, 172, (1989).

Satas, Handbook of Pressure Sensitive Adhesive Technology, 173, (1989).

International Search Report for PCT International Application No. PCT/US2016/028539, dated Jun. 13, 2016, 5 pages.

* cited by examiner

ACRYLIC ADHESIVE COMPOSITIONS AND ACRYLIC ADHESIVE TAPES WHICH ENABLE CLEAN REMOVAL FROM DELICATE SURFACES

TECHNICAL FIELD

Acrylic adhesives that maintain sufficient shear holding characteristics but enable clean removal from an adherend without adversely affecting the delicate surfaces of the adherend.

BACKGROUND

Pressure-sensitive adhesives ("PSAs") are generally known to possess properties that include: (1) aggressive and permanent tack, (2) adherence with no more than finger pressure, (3) sufficient ability to hold onto an adherend, and (4) sufficient cohesive strength to be removed cleanly from the adherend. Polymers that have been found to function well as PSAs, including acrylic polymers, are designed and formulated to exhibit the requisite viscoelastic properties resulting in a desired balance of characteristics such as tack, peel adhesion, and cohesion (shear holding strength).

With the broadened use of pressure-sensitive tapes over the years, performance requirements have become more demanding. For example, manufacturers of consumer goods often find it desirable to bind individual packages or cartons of goods together to form multipack units ("multipacks"). Typically, non-adhesive plastic wrap, such as shrink wrap, has been employed to create the multipacks. However, the desire to improve economics and reduce overall waste has created an opportunity for PSA's in this particular application. In such applications, the shear holding strength of conventional PSA's is sufficient to bind the individual packages or cartons together in a multipack. However, the packages or cartons of consumer goods often have delicate surfaces that include fanciful markings or brand indicia. Often times, the attempted removal of the PSA to separate individual elements of the multipack results in the at least partial destruction, delamination or tearing of the surface layer of one or more packages in the multipack. This adverse result negatively impacts the overall appearance of the individual packages, including the fanciful markings or brand indicia, and is an undesirable consequences for manufacturers of such consumer goods. Conventional PSA formulations don't always possess the requisite balance of adhesive properties to enable sufficient shear holding strength and then subsequently permit the clean removal of the PSA after prolonged attachment to the delicate surfaces of the packages in the multipack.

SUMMARY

This disclosure is directed at specific acrylic adhesives that are capable of achieving a desired balance of adhesive characteristics, particularly with applications involving substrates with delicate surfaces sensitive to tearing or delamination. In certain embodiments, the acrylic adhesives of this disclosure are non-polar adhesives that possess a low peel adhesion at relatively higher peel rates coupled with low adhesion build up and high shear strength values. This combination of performance characteristics enables the adhesive to function in certain embodiments as a PSA for applications involving articles that are sensitive to delamination or tearing upon removal of the PSA from the article. The adhesive properties enabled by certain embodiments of this disclosure offer sufficient bond strength and the subsequent clean removal of the adhesive after prolonged attachment to such delicate surfaces.

In certain embodiments, the acrylic adhesive of this disclosure are derived from the reaction product of (i) an acrylic acid ester of monohydric alcohol having an alkyl group of 5 to 10 carbon atoms; and (ii) a nonpolar acrylic monomer having a solubility of less than 9.2 as measured with the Fedors method using a homopolymer of the nonpolar acrylic monomer. The acrylic adhesive exhibits side chain crystallinity as indicated by fusion enthalpy of at least 2.5 J/g. Side chain crystallinity modifies the performance of the adhesive in certain applications due to the reduced segmental mobility of these side chains that limit adhesion build up over extended application time. The adhesives of noted composition also possess desirable cohesive properties as indicated by a relatively high shear holding strength. The acrylic adhesives may optionally comprise other monomers, crosslinking agents, and other additives such as tackifiers.

An acrylic adhesive assembly may be created by applying the adhesive derived from the reaction product of (i) an acrylic acid ester of monohydric alcohol having an alkyl group of 5 to 10 carbon atoms; and (ii) a nonpolar acrylic monomer having a solubility of less than 9.2 may be applied onto various substrates. The assembly has the acrylic adhesive layer disposed on at least a portion of a surface of the substrate. In some embodiments, the acrylic adhesive assembly may possesses a desired low adhesion, high tack and appropriate cohesive strength to enable the assembly to function as a PSA for applications involving articles with delicate surfaces. In other embodiments, the acrylic adhesive assembly may exhibit a peel adhesion value of less than 3 N/dm according to the Peel Adhesion Test, at a peel rate of 300 mm/min and a peel adhesion value of less than 4.5 N/dm according to the Peel Adhesion Test, at a peel rate of 2290 mm/min. The relatively high peel rate of 2290 mm/min replicates the speed at which a person would remove a PSA from the surface of an article and therefore is more closely representative of at least some of the intended applications embodied in this disclosure, such as the separation of individual packages from a multipack. In certain applications such as a PSA for delicate surfaces, a low peel adhesion followed by a low adhesion build up is desirable otherwise the adhesive becomes permanent and may cause damage when attempting to separate the adhesive assembly from a package having a delicate surface.

The acrylic adhesive of this disclosure derived from an acrylic acid ester of monohydric alcohol and a nonpolar acrylic monomer may be produced utilizing conventional polymerization practices such as solvent polymerization, emulsion polymerization, or bulk polymerization.

Certain embodiments of the acrylic adhesive of this disclosure provide the desired balance of peel adhesion, tack, and shear holding strength.

The following terms used in this application are defined as follows:

"Acrylate" or "Acrylic" is inclusive of both acrylate and (meth)acrylate or acrylic and (meth)acrylic.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms.

Natural resources such as crude oil, coal, and peat which take longer than 100 years to form are not considered to be renewable resources.

"Solubility Parameter" refers the solubility of the homopolymer derived from a select monomer using the Fedors method.

DETAILED DESCRIPTION

Figure 1:
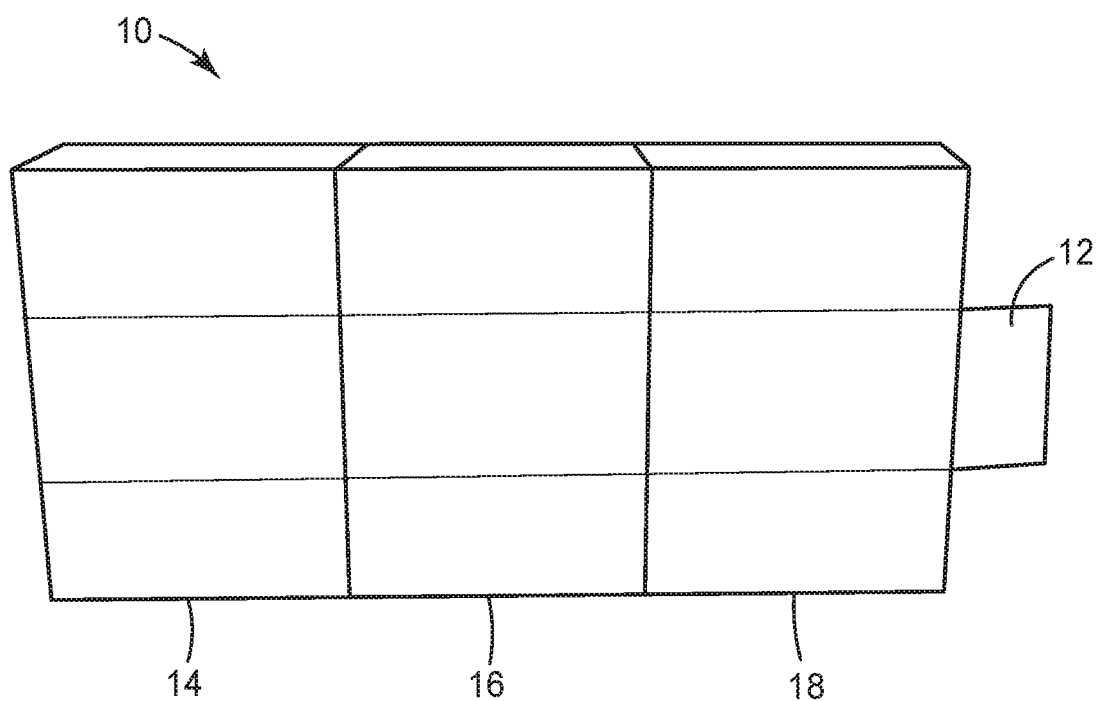
FIG. 1 depicts a multipack bound together using an adhesive assembly comprising an adhesive produced in accordance with this disclosure.

Acrylic adhesives of this disclosure are derived from the reaction product of (i) an acrylic acid ester of monohydric alcohol having an alkyl group of 5 to 10 carbon atoms; and (ii) a nonpolar acrylic monomer having a solubility of less than 9.2. The reaction product also exhibits side chain crystallinity in the acrylic adhesives resulting in a reduced segmental mobility of these side chains. The acrylic adhesive may be created in the form of a hot melt adhesive of a pressure-sensitive adhesive.

For purposes of this disclosure, a pressure-sensitive adhesive or PSA can be identified by a means known as the Dahlquist criterion. This criterion defines a PSA as an adhesive having a 1 second creep compliance of greater than $1 \times 10^{-6}$ $cm^2$/dyne as described in *Handbook of PSA Technology*, Donatas Satas (Ed.), $2^{nd}$ Edition, p. 172, Van Nostrand Reinhold, New York, N.Y., 1989. Alternatively, since modulus is, to a first approximation, the inverse of creep compliance, PSA's may be defined as adhesives having a Young's modulus of less than $1 \times 10^6$ dynes/$cm^2$. Another well-known means of identifying a PSA is that it is aggressively and permanently tacky at room temperature and firmly adheres to a variety of dissimilar surfaces upon mere contact without the need of more than finger or hand pressure, and which may be removed from smooth surfaces without leaving a residue as described in *Glossary of Terms Used in the Pressure Sensitive Tape Industry* provided by the Pressure Sensitive Tape Council, 1996. Another suitable definition of a suitable PSA is that it preferably has a room temperature storage modulus within the area defined by the following points as plotted on a graph of modulus versus frequency at 25 degrees centigrade: a range of moduli from approximately $2 \times 10^5$ to $4 \times 10^5$ dynes/$cm^2$ at a frequency of approximately 0.1 radians/sec (0.017 Hz), and a range of moduli from approximately $2 \times 10^6$ to $8 \times 10^6$ dynes/$cm^2$ at a frequency of approximately 100 radians/sec (17 Hz) (for example see FIG. 8-16 on p. 173 of *Handbook of PSA Technology* (Donatas Satas, Ed.), $2^{nd}$ Edition, Van Nostrand Rheinhold, N.Y., 1989). Any of these methods of identifying a PSA may be used to identify suitable PSA's produced in accordance with this disclosure.

Conventional acrylic ester adhesives are typically an elastomeric polymer comprised primarily of a low $T_g$ non-polar acrylate monomer, as well as a small amount of polar acrylic monomer such as acrylic acid. Two widely used low $T_g$ acrylates in the acrylic adhesives 2-ethylhexyl acrylate (EHA) and isooctyl acrylate (IOA), each providing an alkyl chain of eight carbon atoms ($C_8$). The embodiments of this disclosure copolymerize a higher $T_g$ non-polar acrylate monomer that possesses a solubility of less than 9.2 with the noted low $T_g$ non-polar acrylate monomer. The resulting non-polar copolymer demonstrates a unique combination of physical characteristics such as low adhesion, high tack and sufficient cohesion to permit removal of the adhesive from an adherend. The $T_g$ of the acrylic adhesive are generally in the range of −35 to −50° C. Certain embodiments produced according to this disclosure exhibit a $T_g$ of about −40 to about −45° C.

An acrylic acid ester of monohydric alcohol having an alkyl group of 5 to 10 carbon atoms is one of the monomers in the acrylic adhesive. The number of carbon atoms are selected to achieve a balance between sufficient $T_g$ values and modulus. A lower number of carbon atoms may adversely impact Tg value and a higher number of carbon atoms may impact the desired tack. The homopolymer of the selected monomer has a $T_g$ less than 0° C. Non-limiting examples of the acrylic acid ester of monohydric alcohol include 2-ethylhexyl acrylate, iso-octyl acrylate, n-octyl acrylate, nonyl acrylate, hexyl acrylate, heptyl acrylate, 2-heptyl acrylate, ethylbutyl acrylate, 3-methylbutyl acrylate, plant-based 2-octyl acrylate and fusel oil acrylate and combinations thereof. In some embodiments, the acrylic acid ester monomers are included in the polymerizable composition at about 40 percent by weight to about 90 percent by weight. In other embodiments, the acrylic acid ester monomers are comprise about 50 percent by weight to about 80 percent by weight of the polymerizable composition.

The acrylic adhesives of this disclosure employ a nonpolar acrylic monomer having a homopolymer with a solubility parameter of less than 9.2 as measured by the Fedors method. The $T_g$ value of the homopolymer is greater than 19° C. The non-polar nature of this monomer limits the adhesion build up over extended application time. It also provides the smooth peel characteristics to the adhesive. Suitable non-polar acrylic monomers are those having alkyl group from about 12 to about 26 carbon atoms. Non-limiting examples include octadecyl acrylate, octadecyl methacrylate, cyclodecyl acrylate, cyclohexyl acrylate, hexadecyl acrylate, isobornyl acrylate, lauryl acrylate, lauryl methacrylate and combinations thereof. The nonpolar acrylic monomer comprises about 10 percent by weight to about 60 percent of the polymerizable composition. In other embodiments, the non-polar acrylate monomers comprise about 20 percent by weight to about 50 percent by weight of the polymerizable composition.

The resulting copolymer from the reaction components of an acrylic acid ester of monohydric alcohol and a nonpolar acrylic monomer possesses side chain crystallinity. The side chain crystallinity reduces segmental mobility of these side chains limiting adhesion build up over time. As a result of the crystallinity, reaction product exhibits a fusion enthalpy of at least 2.5 J/g, at least 5.5 J/g, or at least 6.0 J/g.

In some embodiments, this disclosure provides an acrylic adhesive derived from plant based or renewable resources. In particular, the acrylic adhesive may be derived, in part, from plant materials. In some embodiments, the present disclosure further provides an adhesive article, wherein the substrate or backing of the adhesive assembly may also be derived from renewable resources.

In some embodiments, the acrylic adhesives may also contain one or more conventional additives. Preferred additives include tackifiers, plasticizers, dyes, antioxidants, and UV stabilizers. Such additives can be used if they do not affect the superior properties of the acrylic adhesives. Those of ordinary skill in the art are capable of selecting an appropriate amount of the optional components to achieve desired end properties.

The monomers can be polymerized by conventional techniques including, but not limited to, solvent polymerization, emulsion polymerization, and bulk polymerization. The monomer mixture may comprise a polymerization initiator, of a type and in an amount effective to polymerize the comonomers.

An optional crosslinking agent may be used in forming the acrylic adhesive. The optional crosslinking agent may be used to achieve a specific balance of adhesive properties for a selected application. A crosslinking agent is generally included in the composition for subsequent crosslinking upon application of the polymer in its desired end state. Upon activation, the crosslinking agent interacts with the functional moieties from the acrylate to improve cohesive strength. The crosslinking agent generally comprises compounds containing hydroxyl, carboxylic acid, isocyanate, azilidine or epoxy functional groups. Non-limiting example of crosslinking agents include benzophenone, triazine and acetophenone derived photocrosslinking compounds; multifunctional acrylates and methacrylates; silanes, organotitanium compounds, or combinations thereof. Those of ordinary skill in the art are capable of selecting a specific crosslinking agent compatible with the chosen monomers and capable of withstanding the intended adhesive manufacturing environment. The crosslinking agent is included in the acrylic adhesive in an amount of about 0.1 to about 2.0 percent by weight.

The acrylic adhesive may be self-tacky or, in alternative embodiments, may be tackified. Useful tackifiers for acrylic adhesives are rosin esters such as that available under the trade name FORAL 85 from Eastman, Inc., aromatic resins such as that available under the trade name PICCOTEX LC from Eastman, Inc., aliphatic resins such as that available under the trade name PICCOTAC 95 from Eastman, Inc., and terpene resins such as that available under the trade names PICCOLYTE A-115 and ZONAREZ B-100 from Arizona Chemical Co. Plant based tackifiers may be well suited in certain applications, such as for example, FORAL 85. Those of ordinary skill in the art with knowledge of this disclosure are capable of selecting an appropriate tackifier in an amount necessary to achieve desired end results for a selected application.

Many of the acrylate monomers used herein may be derived from plant based resources. In some embodiments, the plant based acrylic acid ester of monohydric alcohol is 2-octyl acrylate or fusel oil acrylate. The acrylic adhesive in certain embodiments comprises a plant based content of at least 25, 30, 35, 40, 45, or 50 percent by weight using ASTM D6866-10, method B. In other embodiments, the acrylic adhesives comprise a plant based content of at least 55, 60, 65, 70, 75, or 80 percent by weight. In yet other embodiments, the acrylic adhesives comprise a plant based content of at least 85, 90, 95, 96, 97, 98 or 99 percent by weight. Those of ordinary skill in the art will additionally recognize that many of the components in an adhesive assembly, such as tackifiers and backing materials, may be derived from plant based resources. In certain embodiments, an adhesive assembly may comprise 25 weight percent or more plant based content.

The acrylic adhesive produced in accordance with this disclosure may be employed to form tapes and transfer adhesive. Acrylic PSA articles may be prepared by coating the composition on a suitable support, such as a flexible backing. Non-limiting examples of materials that can be included in the flexible backing include polyolefins, such as polyethylene, polypropylene, polystyrene, polyester, polyvinyl chloride, polyurethane, polyvinyl alcohol, poly(ethylene terephthalate), poly(butylene terephthalate), poly(caprolactam), poly(vinylidene fluoride), polylactides, cellulose acetate, ethyl cellulose, paper, silicone and combinations thereof. Other non-limiting examples of commercially available backing materials include kraft paper, spun-bond polyolefins, porous films obtained from polyolefins, and multi-layered constructions. In some embodiments involving an adhesive assembly well suited for application onto delicate surfaces, monoaxially, biaxially or non-oriented polyolefins or polyvinyl chloride substrates may be used.

In some embodiments, the substrate may derived from plant based or renewable resources. For example, polylactic acids, poly-L-lactic acid, and a random copolymer of L-lactic acid and D-lactic acid, and derivatives thereof may be suitable as a substrate. Other non-limiting plant based materials that can serve as substrates include polyhydroxyalkanoates, poly-3-hydroxybutyrate, and certain polyolefins derived from renewable feedstocks.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with adhesives such as labels, tapes, signs, covers, marking indicia, and the like. Examples of standard dry coating weights for multipack tapes are in the range of 8 to 15 g/sqm. Higher coating weights may result in greater adhesion. However, those of ordinary skill in the art will recognize that increased adhesion may potentially result in the damage of packaging during the removal of the tape.

The above-described acrylic PSA compositions are coated on a substrate using conventional coating techniques modified as appropriate to the particular substrate. For example, these compositions can be applied to a variety of solid substrates by methods such as gravure roll coating, roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary from a few microns to a few hundred microns. Those of ordinary skill in the art are capable of selecting an appropriate coating technique to match the backing and desired end use application.

The backing for the acrylic adhesive may also comprise a release-coated substrate. Such substrates are typically employed when an adhesive transfer tape is provided. Examples of release-coated substrates are well known in the art and include, by way of example, silicone-coated kraft paper and the like.

Various forms of radiation may be employed to cure the adhesive using crosslinking agents once acrylic adhesive is applied onto a backing. For example, actinic radiation is well suited to initiate crosslinking. For purposes of this disclosure actinic radiation means electromagnetic radiation capable of inducing a chemical change in a material. Non-limiting examples of actinic radiation include wavelengths in the ultraviolet (UV) and/or visible regions of the spectrum, and electron beam radiation.

The acrylic adhesives of this disclosure are well suited for applications involving requiring easily removable tape that can be firmly adhered to a substrate, and subsequently removed without damaging the substrate and without transferring adhesive to the substrate. In some embodiments, the adhesive assembly of this disclosure is capable of binding two or more containers together. The binding of two or more containers may be referred to as a multipack. In selected applications, the adhesive assembly possesses the requisite balance of adhesive properties to enable sufficient shear holding strength and then subsequently permit the clean removal of the acrylic adhesive after prolonged attachment to delicate surfaces of containers in a multipack.

For purposes of this disclosure, delicate surfaces refers to articles, such as containers or packages, that are sensitive to delamination or tearing upon removal of an adhesive from the article. Non-limiting examples include paper, cartons, cardboard, film, films of cellophane, monoaxially, biaxially or non-oriented polyolefins or polyvinyl chloride films. The adhesive properties enabled by certain embodiments of this disclosure possess a low peel adhesion at relatively higher peel rates coupled with low adhesion build up and high shear strength values. This combination of performance characteristics enables the adhesive to function in certain embodiments as a PSA for applications involving multipacks having containers with delicate surfaces. The term "delicate surfaces," as used in this disclosure, refers to plastic films with tear resistance lower than 300 gf according to method ASTM D1004-13, paper, paperboard, cardboard or combinations thereof. Upon subsequent removal of the acrylic pressure sensitive adhesive assembly, the acrylic pressure sensitive adhesive exhibits no cohesive failure and the surfaces of the two or more containers remain whole. Also, for purposes of this disclosure, the term "whole" indicates that the condition of the container, including its surface, is substantially similar to its condition prior to application of the acrylic PSA, with certain substrates, the removal of the adhesive assembly will not cause tearing or delamination.

FIG. 1 depicts a multipack 10 bound together using an adhesive assembly 12 having an adhesive produced in accordance with this disclosure coated onto a substrate. The multipack 10 of FIG. 1 is made up of individual containers 14, 16, 18 having delicate surfaces. The adhesive assembly is wrapped around a periphery of the multipack to hold the containers together. The container are released from the multipack by removing the adhesive assembly. The delicate surfaces of the containers are not damaged or torn upon removal of the adhesive assembly.

Some embodiments of the acrylic adhesive are capable of forming an acrylic adhesive assembly that exhibits a peel adhesion value of less than 3 N/dm according to ASTM D3330 test method A and peel angle of 180, peel rate 300 mm/min and a peel adhesion value of less than 4.5 N/dm according to the Peel Adhesion Test, at a peel rate of 2290 mm/min on a stainless steel pane conforming to Type 302 of Specification A666. The relatively high peel rate of 2290 mm/min is intended to replicate the speed at which a consumer of commercial goods would tear off the acrylic adhesive assembly to utilize one or more of the containers bound together in a multipack. The Peel Adhesion Test is noted below in the Examples.

The adhesive assembly may also possess other desirable characteristics suitable for binding containers together. For example, the adhesive assembly may comprise one or more of (i) a loop tack value greater than 6 N/dm according to ASTM D6195-03 test method B, and (ii) shear value of greater than 10,000 shear min according to ASTM D3654 test procedure A. In certain embodiments, the shear value may be greater than 12,000 shear min, greater than 15,000 shear min, or even greater than 17,000 shear min.

The acrylic adhesives balance of adhesive properties to enable sufficient shear holding strength and then subsequently permit the clean removal of the acrylic adhesive is not the only defining attribute of the composition of this disclosure. The acrylic adhesive has at least a 1 second creep compliance of greater than $1 \times 10^{-6}$ cm$^2$/dyne.

The acrylic PSA's disclosed herein are well suited for other application areas that include, for example, tapes/films for surface protection, reclosable labels and tapes, skin and wound tapes.

EXAMPLES

Test Procedures
Peel Adhesion:
Peel adhesion was measured following the procedure outlined in ASTM D 3330/D 3330M-04, "Standard Test Method for Peel Adhesion of Pressure-Sensitive Tape." Samples of adhesive tapes measuring 12 mm in width and 20 cm in length were cut and adhered to a Type 302 stainless steel plate. A 2 kg roller was rolled over each sample twice. The stainless steel plate was cleaned prior to adhering the adhesive tape by wiping the plate with isopropyl alcohol using a tissue paper. The adhesive tape remained adhered to the plate for about fifteen minutes before the force required to peel the tape was measured using an IMASS Adhesion Tester SP-2100 (available from Imass, Inc., Hingham, Mass.) equipped with a 5 kg load cell. Peel angle was 180 degrees unless otherwise noted. Peel adhesion was measured in grams per 12 mm and at speeds of 50, 150, 300, 500, 1000, 1500, 2290 and 3000 millimeters per minute. Measurements were done in triplicate. The average peel adhesion is reported in Newtons/decimeter (N/dm).

Shear Strength:
Shear strength was measured following the test procedure A described in ASTM D3654-06, "Standard Test Methods for Shear Adhesion of Pressure-Sensitive Tapes." A 25 mm strip of adhesive tape was adhered to a previously cleaned stainless steel plate. The strip was subsequently cut leaving a 25 mm by 25 mm square sample. A 2 kg roller was rolled over each sample twice. A 1000 g load was attached to the tape sample using a hook. Each sample was suspended until failure and/or test was manually terminated. Failure time and mode of failure were recorded. Measurements were done in triplicate and averaged.

Loop Tack:
Loop tack was measured following the test method B procedure described in ASTM D6195-03, "Standard Test Methods for Loop Tack". Samples of adhesive tape measuring 25 mm by 100 mm were cut and a loop was formed and attached to a mobile arm of a Loop Tack tester (LT-500, ChemInstruments, Inc.). The force required to remove the tape at 300 mm/min was measured in grams per 25 mm. Measurements were done in triplicate. Average loop tack is reported in Newtons/decimeter (N/dm).

Adhesion to Different Substrates
The following substrates (each 50 mm by 150 mm) were provided: alkaline white sulfite paper 75 g/m$^2$ (from Gimba), non-treated BOPP (from Vitopel, Brazil) and paperboard coated with varnish (from Celupa Industrial Celulose e Papel, Brazil). Each substrate was adhered to Type 302 stainless steel plates using double coated tape. A sample 12 mm wide by 20 cm long of adhesive tape was cut and adhered to the substrate by rolling a 2 kg roller onto the tape twice. The samples were subsequently aged for 72 hours at 67° C. in a laboratory oven. Samples were conditioned at 25° C. and 50% relative humidity (RH) for 24 hours. The force required to peel the adhesive tape from the substrate was measured using the IMASS Adhesion Tester SP-2100 equipped with a 5 kg load cell. Peel adhesion was measured in grams per 12 mm at a speed of 2290 mm per minute and at a 135 degree angle (to simulate the removal of the tape by a customer). Measurements were done in triplicate. The average peel adhesion is reported in Newtons/decimeter (N/dm).

Surface Energy

Surface energy of different substrates was calculated using the Wu equation. Static contact angles of two solvents, water and ethylene glycol, on the surface of the substrate were measured using Contact Angle System OCA Dataphysics equipment.

Inherent Viscosity

The test method for Inherent Viscosity is based on a comparison of the cinematic viscosity of a diluted solution of the adhesive and the pure solvent used to prepare this diluted solution. The solvent used was ethyl acetate. This cinematic viscosity was measured using an Ostwald-Fenske viscometer, using an automatic equipment from Lauda DR. R. Wobser GMBH & Co. KG, from Germany, model Lauda Viscotemp 15. The solution was prepared and 10 ml of this solution was added to the equipment and it measured the cinematic viscosity, in seconds, for this solution. The adhesive solution was then replaced by pure solvent and the viscosity was measured. The polymer solution concentration was also measured using an oven at 120° C. The equipment calculated the Inherent Viscosity based on the following theoretical relationship:

The inherent viscosity is defined as:

$$\eta_{inh} = \frac{\ln \eta_{rel}}{c}$$

Where C is the mass concentration of the polymer (g/dL) and $\eta_{rel}$ is the relative viscosity, which is defined as $$\eta_{rel} = \frac{\eta}{\eta_0}$$

Where $\eta$ is the viscosity of the solution and $\eta_0$ is the viscosity of the pure solvent. The unit of inherent viscosity is dL/g.

Modulated Differential Scanning Calorimeter (MDSC):

The specimens were prepared for thermal analysis by weighing and loading the material into TA Instruments aluminum DSC sample pans. The specimens were analyzed using the TA Instruments Q2000 Modulated Differential Scanning Calorimeter (MDSC) utilizing a heat-cool-heat method in temperature modulated mode (−90 to 200° C. at 4° C./min. with a modulation amplitude of ±0.64° C. and a period of 60 sec.).

After data collection, the thermal transitions were analyzed using the TA Universal Analysis program. Any peak transitions were evaluated using the heat flow (HF), reversing heat flow (REV HF) or non-reversing heat flow (NR HF) curves. Peak area values and/or peak minimum/maximum temperatures are also determined; peak integration results are normalized for sample weight and reported in J/g.

Materials

| Chemical Name | Abbreviation | Supplier | Location |
| --- | --- | --- | --- |
| 2-Ethylhexyl Acrylate | 2EHA | BASF Corp. | Florham Park, NJ |
| Butyl Acrylate | BA | BASF Corp. | Florham Park, NJ |

-continued

| Chemical Name | Abbreviation | Supplier | Location |
| --- | --- | --- | --- |
| Octadecyl Acrylate | ODA | Akzo Nobel N. V. | Amsterdam, Netherlands |
| Isobornyl Acrylate | IBA | San Esters Corp. | New York, NY |
| Ethyl Acetate | EtOAc | Rhodia, Solvay Group | Lyon, France |
| Toluene | Toluene | Ipiranga | Rio Grande Do Sul, Brazil |
| Azobisisobutyronitrile | VAZO 64 | E. I. du Pont de Nemours and Company | Wilmington, DE |
| Acryloxyethoxy-benzophenone | AEBP | 3M Company | St. Paul, MN |
| Acryloxybenzophenone | ABP[1] | | |
| Isooctylthioglicolate | IOTG | Evans Chemetics LP | Teaneck, NJ |
| Polypropylene Film | BOPP | Vitopel | Sao Paulo, Brazil |

[1]ABP was produced according to the disclosure of U.S. Pat. No. 4,737,559 (Kellen et al.)

PREPARATION OF EXAMPLES

Preparation of Comparative Adhesive Composition 1 and 2

Ingredients were added to a 1000 ml four-necked reaction vessel, equipped with a stirrer, nitrogen line, condenser, and a PT100 thermocouple in the following order: acrylate monomers, ethyl acetate (ethyl ac.), and, optionally, AEBP (50% solids in ethyl acetate) were charged. A slight nitrogen purge was placed in the solution and this solution reaction was heated to 62° C. When the temperature reached 62° C., a solution of 0.20 grams of VAZO 64 in 5 grams of ethyl acetate was added to the solution reaction. This solution was kept in reaction for about 24 hours, and a 98-99% conversion was obtained. Inherent viscosity of the adhesive was measured. Ingredients (reported in grams) and inherent viscosity (IV) of Comparative Adhesive Composition 1 are shown, respectively, in Tables 1 and 2, below.

Comparative Adhesive Composition 2 was produced in the same manner as Comparative Adhesive Composition 1, except that the amount of each ingredient were varied as reported in Table 2.

Comparative Adhesive Composition 1 is similar to the adhesive composition described in Example 25 of U.S. Pat. No. 5,552,451 (Everaerts, et al). Whereas Comparative Adhesive Composition 2 is similar to the adhesive composition described in Example 17 of U.S. Pat. No. 5,552,451.

Preparation of Adhesive Composition 1

Adhesive Composition 1 was prepared as described above for Comparative Adhesive Composition 1, except that the following ingredients/conditions were used: (i) a solution of ODA in toluene (ODA sol.) (45.2% solids); (ii) 0.35 g of VAZO™ 64 in 5 grams of ethyl acetate; and (iii) the reaction solution was heated to a temperature of about 58° C. Ingredients (reported in grams) and inherent viscosity (IV) of Adhesive Composition 1 are shown, respectively, in Tables 1 and 2, below.

TABLE 1

| Adhesive Comp. | 2EHA (g) | BA (g) | ODA (g) | IBA (g) | ODA sol. (g) | AEBP (g) | ABP | EtOAc (g) | IOTG (g) |
|---|---|---|---|---|---|---|---|---|---|
| Comparative Adhesive Comp. 1 | 0 | 132.0 | | 0 | 072.4 | | 1.32 | 155.1 | 0 |
| Comparative Adhesive Comp. 2 | | 109.2 | | | 102.6 | | 1.25 | 146.6 | 0 |
| Adhesive Comp. 1 | 121.3 | 0 | 0 | 0 | 96.7 | 0.825 | | 155 | 0 |

ABP is a 25% solids solution in ethyl acetate

TABLE 2

| Adhesive Compositions | IV (dL/g) |
|---|---|
| Comparative Adhesive Composition A | 0.75 |
| Comparative Adhesive Composition B | 0.56 |
| Adhesive Composition 1 | 0.45 |

Modulated Differential Scanning Calorimeter (MDSC) Results

Peak transitions were evaluated using the heat flow (HF), reversing heat flow (REV HF) or non-reversing heat flow (NR HF) curves. Peak area values and/or peak minimum/maximum temperatures are also determined; peak integration results are normalized for sample weight and reported in J/g. Fusion enthalpy results are reported in Table 3. Comparative adhesive compositions 1 and 2, with fusion enthalpy results below 2.5 J/g, are generally considered amorphous materials for purposes of this disclosure. They did not exhibit adhesion characteristics comparable to Composition 1.

TABLE 3

| Adhesive Compositions | Fusion Enthalpy (J/g) |
|---|---|
| Composition 1 | 6.7 |
| Comparative Adhesive Composition 1 | 1.3 |
| Comparative Adhesive Composition 2 | 0.1 |

Comparative Examples 1-2 and Example 1

Adhesive tapes were prepared using the following procedure: adhesive compositions were manually coated onto a biaxially oriented polypropylene backing film (BOPP, 40 micron thick) using a coating knife and dried for 15 minutes in a laboratory oven set at a temperature of about 65° C. After the drying period, the adhesive coating weight was between about 14 and about 16 g/m². The adhesive tape was cured using a Fusion Curing System Unit, Model VPS/I600 (from Fusion Systems Corp, Rockville, Md.) with a total energy of 50 mJ/cm² to crosslink the adhesive. The Fusion Curing System Unit comprised one lamp with an H bulb with a power supply of 300 Watts/inch (118.1 watts/cm). The UVC radiation dose was controlled by the power settings of the device, the conveyor speed setting, and the number of passes of the adhesive under the ultraviolet light.

Comparative Examples 1 and 2 were prepared using, respectively, Comparative Adhesive Compositions 1 and 2. Example 1 was prepared using Adhesive Composition 1.

Comparative Example 3

A commercially available adhesive tape was obtained under the trade designation "Scotch Multipack Tape 693" from 3M Company of St. Paul, Minn., and is hereinafter referred to as Comparative Example 1.

Comparative Example 4

A commercially available adhesive tape was obtained under the trade designation "Scotch Multipack Tape 694" from 3M Company of St. Paul, Minn., and is hereinafter referred to as Comparative Example 2.

Comparative Example 5

A commercially available adhesive tape was obtained under the trade designation ""Scotch Multipack Tape 695" from 3M Company of St. Paul, Minn., and is hereinafter referred to as Comparative Example 3.

Test Results

Comparative Examples 1-5, and Example 1 were submitted to peel adhesion measured at a peel angle of 180 degrees and peel rate of 3000 mm/min, loop tack and shear tests, using the procedures described above. Results are reported in Table 4, below.

TABLE 4

| Examples | Peel adhesion (N/dm) | Loop Tack (N/dm) | Shear (min) |
|---|---|---|---|
| Comparative Example 1 | 3.4 | 5.7 | >17,460 |
| Comparative Example 2 | 3.1 | 6.7 | >15,947 |
| Comparative Example 3 | 7.5 | 12.0 | 4,835 |
| Comparative Example 4 | 7.1 | 5.8 | 3,213 |
| Comparative Example 5 | 5.3 | 5.5 | not measured |
| Example 1 | 1.3 | 8.9 | >17,480 |

Comparative Examples 1-5, and Example 1 were tested for peel adhesion at varying peel rates at a peel angle 180 degrees. Results are reported in Table 5, below.

TABLE 5

| | | Peel Adhesion (N/dm) | | | | |
|---|---|---|---|---|---|---|
| Peel rate (mm/min) | Example 1 | Comparative Example 1 | Comparative Example 2 | Comparative Example 3 | Comparative Example 4 | Comparative Example 5 |
| 50 | 0.36 | 1.9 | 1.3 | not measured | not measured | not measured |
| 150 | 0.75 | 2.1 | 2.0 | 4.8 | 3.7 | 2.0 |
| 300 | 1.3 | 3.4 | 3.1 | 6.6 | 4.2 | 3.1 |
| 500 | 1.6 | 5.0 | 3.4 | 8.0 | 5.3 | 4.2 |

TABLE 5-continued

| | Peel Adhesion (N/dm) | | | | | |
|---|---|---|---|---|---|---|
| Peel rate (mm/min) | Example 1 | Comparative Example 1 | Comparative Example 2 | Comparative Example 3 | Comparative Example 4 | Comparative Example 5 |
| 1000 | 2.4 | 6.6 | 4.1 | 10.2 | 5.5 | 6.0 |
| 1500 | 2.9 | 7.5 | 4.8 | 10.8 | 7.0 | 6.5 |
| 2290 | 3.8 | 7.8 | 4.6 | 14.6 | 10.0 | 10.3 |

As it may be seen in Table 5, above, peel adhesion of Example 1 is not as sensitive to varying peel rates as the Comparative Examples.

Adhesive Composition 1 was also coated onto different backing films, following the procedure described above to evaluate the effect of backing film and peel adhesion. Peel adhesion was tested using a peel angle of 135 degrees and peel rate of 2290 mm/min. Results are reported in Table 6, below.

TABLE 6

| Backing | Adhesive Composition 1 Peel adhesion (N/dm) |
|---|---|
| BOPP 40 micra | 1.3 |
| BOPP 28 micra | 2.2 |
| PET 40 micra | 0.9 |

Example 1 and Comparative Example 4 were adhered to different substrates and aged, following the procedures described above. Coated paperboard had a surface energy of about 34 mN/m. BOPP 40 micra had a surface energy of was a non-treated biaxially oriented polypropylene. Peel adhesion was measured after aging (aged). Damage to the substrate is reported as "damaged" and "not damaged", wherein "damaged" means that damage to the substrate (e.g., removal of fibers, delamination, tearing, and ink or varnish removal) were observed. Results are reported in Table 7, below.

TABLE 7

| | | Coated paperboard | | Sulfite Paper | | BOPP 40 micra | |
|---|---|---|---|---|---|---|---|
| Examples | | Peel Adhesion (N/dm) | Damage to substrate | Peel Adhesion (N/dm) | Damage to substrate | Peel Adhesion (N/dm) | Damage to substrate |
| Example 1 | Aged | 129.7 | None | 54.4 | None | 136.6 | None |
| Comp. Ex. 4 | Aged | 202.9 | Removed fibers | 103.9 | Delaminated | 327.4 | None |

What is claimed is:

1. A composition comprising an acrylic adhesive derived from the reaction product of:
   (a) an acrylic acid ester of monohydric alcohol having an alkyl group of 5 to 10 carbon atoms; and
   (b) a nonpolar acrylic monomer having a solubility of less than 9.2 as measured by the Fedors method using a homopolymer of the nonpolar acrylic monomer,
   wherein the reaction product has side chain crystallinity.

2. A composition according to claim 1, wherein the reaction product exhibits a fusion enthalpy of at least 2.5 J/g.

3. A composition according to claim 1, wherein the nonpolar acrylic monomer having alkyl group from about 12 to about 26 carbon atoms.

4. A composition according to claim 3, wherein the acrylic acid ester of monohydric alcohol comprises 2-ethylhexyl acrylate, iso-octyl acrylate, 2-octyl acrylate, n-octyl acrylate, nonyl acrylate, hexyl acrylate, heptyl acrylate, 2-heptyl acrylate, ethylbutyl acrylate, 3-methylbutyl acrylate, fusel oil acrylate and combinations thereof.

5. A composition according to claim 4, further comprising a crosslinking agent.

6. A composition according to claim 5, wherein the crosslinking agent comprises a benzophenone, a triazine or acetophenone derived photocrosslinking compound; a multifunctional acrylate or methacrylate; a silane, an organotitanium compound, or combinations thereof.

7. A composition according to claim 1, further comprising a crosslinking agent.

8. A composition according to claim 7, wherein the crosslinking agent comprises a benzophenone, a triazine or acetophenone derived photocrosslinking compound; a multifunctional acrylate or methacrylate; a silane, an organotitanium compound, or combinations thereof.

9. A composition according to claim 1, wherein the acrylic acid ester of monohydric alcohol comprises 2-ethylhexyl acrylate, iso-octyl acrylate, 2-octyl acrylate, n-octyl acrylate, nonyl acrylate, hexyl acrylate, heptyl acrylate, 2-heptyl acrylate, ethylbutyl acrylate, 3-methylbutyl acrylate, fusel oil acrylate and combinations thereof.

10. A composition according to claim 9, wherein the 2-octyl acrylate and fusel oil acrylate are biobased.

11. A composition according to claim 9, further comprising a crosslinking agent.

12. A composition according to claim 11, wherein the crosslinking agent comprises a benzophenone, a triazine or acetophenone derived photocrosslinking compound; a multifunctional acrylate or methacrylate; a silane, an organotitanium compound, or combinations thereof.

13. A composition according to claim 1, wherein the nonpolar acrylic monomer comprises an octadecyl acrylate, an octadecyl methacrylate, a lauryl acrylate, a lauryl methacrylate or combinations thereof.

14. A composition according to claim 13, wherein the acrylic acid ester of monohydric alcohol comprises 2-ethylhexyl acrylate, iso-octyl acrylate, 2-octyl acrylate, n-octyl acrylate, nonyl acrylate, hexyl acrylate, heptyl acrylate, 2-heptyl acrylate, ethylbutyl acrylate, 3-methylbutyl acrylate, fusel oil acrylate and combinations thereof.

15. A composition according to claim 13, further comprising a crosslinking agent.

16. A composition according to claim 15, wherein the crosslinking agent comprises a benzophenone, a triazine or acetophenone derived photocrosslinking compound; a multifunctional acrylate or methacrylate; a silane, an organotitanium compound, or combinations thereof.

17. A composition according to claim 1, further comprising a tackifier.

18. A composition according to claim 1, wherein the acrylic adhesive is a pressure sensitive adhesive or a hot melt adhesive.

19. An article comprising an adhesive assembly having a substrate and an adhesive layer disposed on at least a portion of a surface of the substrate, wherein the adhesive comprises the composition according to claim 1.

20. An article comprising an adhesive assembly having a substrate and an adhesive layer disposed on at least a portion of a surface of the substrate, wherein the adhesive comprises the composition according to claim 6.

\* \* \* \* \*

UNITED STATES PATENT AND TRADEMARK OFFICE
CERTIFICATE OF CORRECTION

PATENT NO. : 11,274,235 B2
APPLICATION NO. : 15/552344
DATED : March 15, 2022
INVENTOR(S) : Joao Talamoni It is certified that error appears in the above-identified patent and that said Letters Patent is hereby corrected as shown below:

In the Claims

Column 13
Line 66, In Claim 4, replace "claim 3" with "claim 1".

Signed and Sealed this
Fourth Day of October, 2022

Katherine Kelly Vidal
Director of the United States Patent and Trademark Office